United States Patent
Lee et al.

(10) Patent No.: US 10,629,892 B2
(45) Date of Patent: Apr. 21, 2020

(54) NEGATIVE ELECTRODE FOR RECHARGEABLE LITHIUM BATTERY, AND RECHARGEABLE LITHIUM BATTERY INCLUDING SAME

(71) Applicant: SAMSUNG SDI CO., LTD., Yongin-si, Gyeonggi-do (KR)

(72) Inventors: Jinhyon Lee, Yongin-si (KR); Bokhyun Ka, Yongin-si (KR); Kyeuyoon Sheem, Yongin-si (KR); Soonho Ahn, Yongin-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 12 days.

(21) Appl. No.: 15/799,238

(22) Filed: Oct. 31, 2017

(65) Prior Publication Data

US 2018/0123120 A1 May 3, 2018

(30) Foreign Application Priority Data

Nov. 1, 2016 (KR) .................... 10-2016-0144621

(51) Int. Cl.
*H01M 4/133* (2010.01)
*H01M 4/1393* (2010.01)
(Continued)

(52) U.S. Cl.
CPC .......... *H01M 4/133* (2013.01); *H01M 4/131* (2013.01); *H01M 4/1393* (2013.01);
(Continued)

(58) Field of Classification Search
None
See application file for complete search history.

(56) References Cited

U.S. PATENT DOCUMENTS

| 8,801,960 B2 | 8/2014 | Ueda et al. |
| 10,320,030 B2 | 6/2019 | Takiguchi et al. |

(Continued)

FOREIGN PATENT DOCUMENTS

| EP | 1032068 A2 | 8/2000 |
| EP | 2 538 484 A1 | 12/2012 |

(Continued)

OTHER PUBLICATIONS

Extended European Search Report dated Dec. 18, 2017, of the corresponding European Patent Application No. 17199464.3.

(Continued)

*Primary Examiner* — Wojciech Haske
(74) *Attorney, Agent, or Firm* — Lee IP Law, PC

(57) ABSTRACT

A negative electrode for a rechargeable lithium battery includes a negative active material layer on a current collector. The negative active material layer includes a carbon-based negative active material. A Degree of Divergence (DD) value of the negative electrode is greater than or equal to about 19. The DD value may be calculated based on the following equation:

$$DD(\text{Degree of Divergence}) = (I_a/I_{total}) \times 100$$

where $I_a$ is a sum of peak intensities at non-planar angles measured by XRD using a CuKα ray and $I_{total}$ is a sum of peak intensities at all angles measured by XRD using a CuKα ray.

17 Claims, 12 Drawing Sheets

(51) Int. Cl.

| | | |
|---|---|---|
| *H01M 4/587* | (2010.01) | |
| *H01M 4/131* | (2010.01) | |
| *H01M 4/485* | (2010.01) | |
| *H01M 4/583* | (2010.01) | |
| *H01M 10/0525* | (2010.01) | |
| H01M 4/38 | (2006.01) | |
| H01M 4/02 | (2006.01) | |
| H01M 4/48 | (2010.01) | |

(52) U.S. Cl.
CPC .......... *H01M 4/485* (2013.01); *H01M 4/583* (2013.01); *H01M 4/587* (2013.01); *H01M 10/0525* (2013.01); H01M 4/386 (2013.01); H01M 4/387 (2013.01); H01M 4/48 (2013.01); H01M 2004/021 (2013.01)

(56) References Cited

U.S. PATENT DOCUMENTS

| | | | |
|---|---|---|---|
| 2001/0016286 A1* | 8/2001 | Senoo | H01M 4/587 429/231.4 |
| 2002/0086211 A1* | 7/2002 | Umeno | H01M 4/0428 429/231.4 |
| 2004/0072076 A1 | 4/2004 | Matsubara et al. | |
| 2006/0024579 A1 | 2/2006 | Kolosnitsyn et al. | |
| 2007/0128518 A1 | 6/2007 | Uono et al. | |
| 2008/0199777 A1 | 8/2008 | Onishi et al. | |
| 2008/0318133 A1 | 12/2008 | Matsuyama et al. | |
| 2009/0214954 A1 | 8/2009 | Onishi et al. | |
| 2012/0021294 A1 | 1/2012 | Zhamu et al. | |
| 2013/0143125 A1 | 6/2013 | Tsujiko et al. | |
| 2013/0177792 A1 | 7/2013 | Takahata et al. | |
| 2014/0065478 A1 | 3/2014 | Mitsuhashi et al. | |
| 2014/0072877 A1 | 3/2014 | Araki et al. | |
| 2014/0134486 A1 | 5/2014 | Uchida et al. | |
| 2014/0227588 A1 | 8/2014 | Kim et al. | |
| 2015/0010818 A1 | 1/2015 | An et al. | |
| 2015/0030931 A1 | 1/2015 | Takahata et al. | |
| 2016/0268608 A1 | 9/2016 | Nishimura et al. | |
| 2018/0123120 A1 | 5/2018 | Lee et al. | |
| 2018/0123131 A1 | 5/2018 | Lee et al. | |
| 2018/0175391 A1 | 6/2018 | Komura et al. | |

FOREIGN PATENT DOCUMENTS

| | | |
|---|---|---|
| EP | 2 660 903 A1 | 11/2013 |
| EP | 2 709 193 B1 | 6/2015 |
| JP | 3705801 B1 | 10/2005 |
| JP | 4150516 | 7/2008 |
| JP | 2012-033375 A | 2/2012 |
| JP | 2013-069432 A | 4/2013 |
| JP | 2014-029833 | 2/2014 |
| JP | 2014-96386 | 5/2014 |
| JP | 5556755 | 6/2014 |
| JP | 5652682 | 11/2014 |
| JP | 2015-138644 A | 7/2015 |
| JP | 2016-131123 A | 7/2016 |
| JP | 2017-063013 A | 3/2017 |
| JP | 2017-063040 A | 3/2017 |
| KR | 10-2007-0046126 A | 5/2007 |
| KR | 10-0912788 | 8/2009 |
| KR | 10-0954306 | 4/2010 |
| KR | 10-1014969 B1 | 2/2011 |
| KR | 10-1106966 B1 | 1/2012 |
| KR | 10-1195081 B1 | 10/2012 |
| KR | 10-2013-0060268 A | 6/2013 |
| KR | 10-2014-0035256 | 3/2014 |
| KR | 10-1582718 B1 | 12/2015 |
| KR | 10-1599322 B1 | 2/2016 |
| KR | 10-2017-0002302 A | 1/2017 |
| WO | WO 2013/108516 A1 | 7/2013 |
| WO | WO 2018/012821 A1 | 1/2018 |

OTHER PUBLICATIONS

Juliette Billaud, et al., "Magnetically aligned graphite electrodes for high-rate performance Li-ion batteries", Nature Energy, vol. 1, No. 8, Jul. 4, 2016 (Jul. 4, 2016), pp. 1-6.
EESR issued Sep. 6, 2019 for EP 19171112.6 which corresponds with co-pending U.S. Appl. No. 16/394,077.
EESR issued Sep. 30, 2019 for EP 19169561.8 which corresponds with this U.S. Appl. No. 16/382,331.
Office action dated Aug. 20, 2019 for related U.S. Appl. No. 15/800,297.
USPTO Office action dated Feb. 4, 2020, in U.S. Appl. No. 15/800,297.

* cited by examiner

NEGATIVE ELECTRODE FOR RECHARGEABLE LITHIUM BATTERY, AND RECHARGEABLE LITHIUM BATTERY INCLUDING SAME

CROSS-REFERENCE TO RELATED APPLICATION

Korean Patent Application No. 10-2016-0144621 filed on Nov. 1, 2016, and entitled, "Negative Electrode for Rechargeable Lithium Battery, and Rechargeable Lithium Battery Including Same," is incorporated by reference herein in its entirety.

BACKGROUND

1. Field

One or more embodiments described herein relate to a negative electrode for a rechargeable lithium battery.

2. Description of the Related Art

Rechargeable lithium batteries power a variety of electronic devices. These batteries use an organic electrolyte solution and therefore have greater discharge voltage and energy density that batteries that use an alkali aqueous solution.

One type of rechargeable lithium battery uses a lithium-transition metal oxide as a positive active material that is capable of intercalating lithium ions, such as $LiCoO_2$, $LiMn_2O_4$, $LiNi_{1-x}Co_xO_2$ ($0<x<1$). A carbon-based material may be used as a negative active material. Examples include artificial graphite, natural graphite, and hard carbon.

SUMMARY

In accordance with one or more embodiments, a negative electrode for a rechargeable lithium battery includes a current collector; and a negative active material layer on the current collector and including a carbon-based negative active material, wherein a Degree of Divergence (DD) value of the negative electrode defined by Equation 1 is greater than or equal to about 19:

$$DD(\text{Degree of Divergence}) = (I_a/I_{total})*100 \quad (1)$$

where $I_a$ is a sum of peak intensities at non-planar angles measured by XRD using a CuKα ray and $I_{total}$ is a sum of peak intensities at all angles measured by XRD using a CuKα ray. A BET specific surface area of the negative electrode may be less than about 5.0 m²/g. The DD value of the negative electrode may be greater than or equal to about 19 and less than or equal to about 60. The negative electrode may have a loading level (L/L) of about 6 mg/cm² to about 65 mg/cm² on one side of the current collector.

The $I_a$ may be a sum of peak intensities at 2θ=42.4±0.2°, 43.4±0.2°, 44.6±0.2°, and 77.5±0.2° measured by XRD using a CuKα ray, and the $I_{total}$ may be a sum of peak intensities at 2θ=26.5±0.2°, 42.4±0.2°. 43.4±0.2°, 44.6±0.2°, 54.7±0.2°, and 77.5±0.2° measured by XRD using a CuKα ray. The peak intensity may be a peak integral area value.

The negative electrode may have a ratio ($I_{(004)}/I_{(002)}$) of a peak intensity at a (004) plane relative to a peak intensity at a (002) plane of greater than or equal to about 0.04 measured by XRD using a CuKα ray. The negative electrode may have a ratio ($I_{(004)}/I_{(002)}$) of a peak intensity at a (004) plane relative to a peak intensity at a (002) plane of greater than or equal to about 0.04 and less than or equal to about 0.07 measured by XRD using a CuKα ray.

The carbon-based negative active material may be artificial graphite or a mixture of artificial graphite and natural graphite. The negative active material layer may include a Si-based negative active material, a Sn-based negative active material, a lithium vanadium oxide, or a combination thereof. The negative electrode may have an active region facing a positive electrode and an inactive region which does not face a positive electrode, and a DD value of the inactive region may be greater than or equal to about 19.

In accordance with one or more other embodiments, a rechargeable lithium battery includes a negative electrode described herein, a positive electrode including a positive active material, and an electrolyte. The rechargeable lithium battery may be a high power battery. The rechargeable lithium battery may be a cylindrical battery or a pouch type battery. The cylindrical battery may be a 18650 type cylindrical battery or a 21700 type cylindrical battery.

In accordance with one or more other embodiments, a negative electrode for a rechargeable lithium battery includes a current collector and a negative active material layer on the current collector, wherein a Degree of Divergence (DD) value of the negative electrode is greater than or equal to about 19. The negative active material layer may include a carbon-based negative active material. A BET specific surface area of the negative electrode may be less than about 5.0 m²/g. The DD value of the negative electrode may be greater than or equal to about 19 and less than or equal to about 60. The negative electrode may have a loading level (L/L) of about 6 mg/cm² to about 65 mg/cm² on one side of the current collector.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
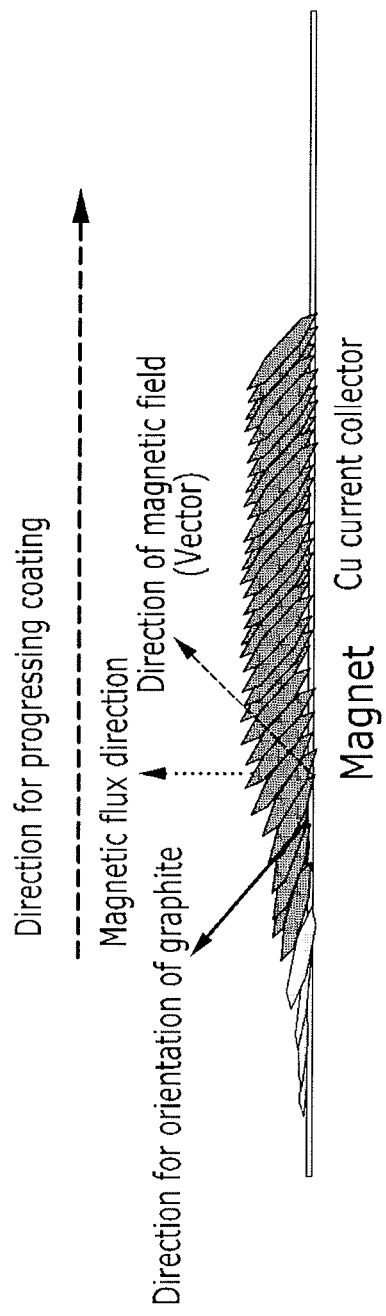
FIG. 1 illustrates an embodiment of a negative active material.

Example embodiments are described with reference to the drawings; however, they may be embodied in different forms and should not be construed as limited to the embodiments set forth herein. Rather, these embodiments are provided so that this disclosure will be thorough and complete, and will convey exemplary implementations to those skilled in the art. The embodiments (or portions thereof) may be combined to form additional embodiments In the drawings, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

When an element is referred to as being "connected" or "coupled" to another element, it can be directly connected or coupled to the another element or be indirectly connected or coupled to the another element with one or more intervening elements interposed therebetween. In addition, when an element is referred to as "including" a component, this indicates that the element may further include another component instead of excluding another component unless there is different disclosure.

According to one or more embodiments, a negative electrode for a rechargeable lithium battery includes a negative active material layer on a current collector. The negative electrode includes a carbon-based negative active material and has a Degree of Divergence (DD) value defined, for example, by Equation 1, that is greater than or equal to about 19.

$$DD(\text{Degree of Divergence}) = (I_a/I_{total}) * 100 \quad (1)$$

where $I_a$ is a sum of peak intensities at non-planar angles measured by XRD using a CuKα ray, and $I_{total}$ is a sum of peak intensities at all angles measured by XRD using a CuKα ray.

The non-planar angles denote $2\theta = 42.4 \pm 0.2°$, $43.4 \pm 0.2°$, $44.6 \pm 0.2°$, and $77.5 \pm 0.2°$ when measured by XRD using a CuKα ray, that is, a (100) plane, a (101)R plane, a (101)H plane, and a (110) plane. Graphite may have a rhombohedral structure or a hexagonal structure, with an ABAB type stacking sequence according to the stacking order graphene layers. The R plane denotes the rhombohedral structure, and the H plane denotes the hexagonal structure.

The all angles mentioned above may denote $2\theta = 26.5 \pm 0.2°$, $42.4 \pm 0.2°$, $43.4 \pm 0.2°$, $44.6 \pm 0.2°$, $54.7 \pm 0.2°$, and $77.5 \pm 0.2°$ when measured by XRD using a CuKα ray, that is, a (002) plane, a (100) plane, a (101)R plane, a (101)H plane, a (004) plane, and a (110) plane. A peak at $2\theta = 43.4 \pm 0.2°$ may appear by overlapping a peak of a (101)R plane of a carbon-based material with another peak of a (111) plane of a current collector, for example, Cu. In at least one embodiment, a peak intensity may indicate the height of a peak or an integral area of the peak.

In an embodiment, the XRD is measured under a measurement condition of $2\theta = 10°$ to $80°$, a scan speed (°/S) of 0.044 to 0.089, and a step size (°/step) of 0.013 to 0.039 by using a CuKα ray as a target ray but removing a monochromator to improve a peak intensity resolution.

In one embodiment, the DD value of the negative electrode may be greater than or equal to about 19 and less than or equal to about 60. The DD value of the negative electrode which satisfies the aforementioned condition may correspond to the case where negative active material in a negative active material layer is oriented at a predetermined angle. This DD value may be maintained after charging and discharging operations. In order to orient a negative active material in the negative active material layer at a predetermined angle, a magnetic field may be applied, while a negative active material composition is coated on a current collector.

For example, in order to manufacture a negative electrode having a DD value of greater than or equal to about 19, or in a range greater than or equal to about 19 and less than or equal to about 60, according to an embodiment the strength of a magnetic field, exposure time to the magnetic field, and viscosity of a negative active material composition may be adjusted or set to predetermined values.

An embodiment of a process for manufacturing the negative electrode includes disposing a current collector on or beneath a magnet and coating negative active material composition including a negative active material on a current collector as in FIG. 1. The strength of the magnetic field of the magnet may be, for example, in a range of 1,000 Gauss to 10,000 Gauss. In addition, the negative active material composition may be coated on the current collector and maintained for 3 seconds to 9 seconds, that is, is exposed to the magnetic field for 3 seconds to 9 seconds. In addition, the negative active material composition may have a viscosity of, for example, about 2000 cps to about 4000 cps at room temperature (about 20° C. to about 25° C.). When the strength of a magnetic field, exposure time to the magnetic field, and the viscosity respectively satisfy the above conditions, a negative electrode having a DD value of greater than or equal to about 19 may be obtained.

For example, when the coating process is performed while the current collector is moved, the magnetic field (magnetic flux) of the magnet may be formed vertically with the current collector. However, because the magnetic field according to a coating speed (e.g., the speed of moving the current collector) is formed at a predetermined angle as a vector function, the negative active material in the negative active material composition may stand, that is, be oriented at the predetermined angle on the surface of the current collector.

In addition, when the DD value is greater than or equal to about 19, the negative active material is not parallel to the current collector, but is oriented sufficiently enough to facilitate movement of Li ions in the negative electrode, that is, to control non-orientation. However, when the DD value is less than about 19, DC internal resistance may be increased, rate capabilities, particularly, high rate capability may be remarkably deteriorated, and cycle-life characteristics may be deteriorated. In addition, when the DD value is greater than or equal to about 19 and less than or equal to about 60, the negative active material is not substantially vertically oriented with the current collector. (However, even when the negative active material is vertically oriented therewith, battery deformation and/or other defects may occur during charging and discharging).

In addition, when the DD value is greater than or equal to about 19, a DC internal resistance (DC-IR) may be minimized by suppressing a resistance increase at the end of the discharge, cycle-life characteristics may be improved, and in addition, energy density may be improved by suppressing expansion of an electrode plate during charges and discharges.

In addition, the DD value of greater than or equal to about 19 indicates orientation of the negative active material on the current collector at a predetermined angle. Accordingly, heat generated when a battery using this negative electrode is charged and discharged or heat generated by short circuit during penetration and collision may be vertically diffused and thus easily discharged outside. Accordingly, ignition of the battery due to thermal runaway and an internal battery temperature increase may be suppressed. As a result, battery characteristics may be improved. The DD value of less than about 19 indicates that the negative active material is substantially horizontally disposed on the current collector, and herein, heat generated therefrom is horizontally diffused and thus not easily discharged outside.

The DD value may be obtained, for example, by charging and discharging a rechargeable lithium battery including the negative electrode, disassembling the battery when completely discharged to obtain the negative electrode, and measuring XRD about the negative electrode. The charge and discharge may be performed, for example, once or twice at about 0.1 C to about 0.2 C.

The negative electrode may have a peak intensity ratio at a (004) plane relative to a (002) plane (e.g., $I_{(004)}/I_{(002)}$) of greater than or equal to about 0.04 (and, for example, greater than or equal to about 0.04 to less than or equal to about 0.07) when XRD is measured by using a CuKα ray. When the negative electrode has $I_{(004)}/I_{(002)}$ of greater than or equal to about 0.04, DC internal resistance may not be increased, rate capabilities (and particularly high rate capability) may be improved, and cycle-life characteristics may also be improved.

In addition, the negative electrode may have a peak intensity ratio at a (110) plane relative to a (004) plane (e.g., $I_{(110)}/I_{(004)}$) of greater than or equal to about 0.3, and in one embodiment greater than or equal to about 0.3 and less than or equal to about 0.7, when XRD is measured by using a CuKα ray. When the negative electrode has $I_{(110)}/I_{(004)}$ of greater than or equal to about 0.3, DC internal resistance may not be increased, but rate capabilities (and particularly high rate capability) may be improved. Also, cycle-life characteristics may be improved. In an embodiment, since the DD value may be a peak value at a non-plane relative to a peak value at all the angles, and thus may not be linked with $I_{(110)}/I_{(004)}$), the $I_{(110)}/I_{(004)}$ of greater than or equal to about 0.3 does not mean a DD value of greater than or equal to about 19.

In one embodiment, a BET specific surface area of the negative electrode may be less than about 5.0 m²/g, or about 0.6 m²/g to about 2.0 m²/g. When the BET specific surface area of the negative electrode is less than about 5.0 m²/g, electrochemical cycle-life characteristics of the cell may be improved. In an embodiment, the BET is measured by charging and discharging a rechargeable lithium battery including the negative electrode, completely discharging the battery down to less than or equal to about 3 V, disassembling the battery to obtain the negative electrode, cutting the negative electrode into a predetermined size, and putting the cut negative electrode in a BET sample holder in a nitrogen gas adsorption method.

The negative electrode may have a loading level (L/L) of about 6 mg/cm² to about 65 mg/cm² on one side of the current collector. The negative electrode may have a loading level (L/L) in a different range in another embodiment. Generally, the negative active material layers are formed on one side of a current collector and another side opposite to that one side. In the specification, the loading level refers to the loading level of the single layer of the negative active material layers on one side of the current collector.

The carbon-based negative active material may be, for example, artificial graphite or a mixture of artificial graphite and natural graphite. When the negative active material is a crystalline carbon-based material (such as artificial graphite or a mixture of natural graphite and artificial graphite), the crystalline carbon-based material may have more developed crystalline characteristics than an amorphous carbon-based active material, and thus may further improve orientation characteristics of a carbon material in an electrode about an external magnetic field. The artificial graphite or natural graphite may be amorphous, sheet-shaped, flake-shaped, spherically-shaped, fiber-shaped, or a combination thereof, or another shape, without a particular limit. In addition, the artificial graphite is mixed with the natural graphite in a ratio of, for example, about 70:30 wt % to about 95:5 wt %.

The negative active material layer may further include an Si-based negative active material, an Sn-based negative active material, or a lithium vanadium oxide negative active material, or a combination thereof, as a semi or metal active material. When the negative active material layer further includes these materials (e.g., the carbon-based negative active material as a first negative active material and the semi or metal active material as a second negative active material), the first and second negative active materials may be mixed in a weight ratio of about 50:50 to about 99:1.

The Si-based negative active material may be Si, a Si—C composite, $SiO_x$ (0<x<2), and an Si-Q alloy (where, for example, Q is an alkali metal, an alkaline-earth metal, a Group 13 element, a Group 14 element, a Group 15 element, a Group 16 element, a transition metal, a rare earth element, and a combination thereof but not Si). The Sn-based negative active material may be, for example, Sn, $SnO_2$, an Sn—R alloy (where, for example, R is an alkali metal, an alkaline-earth metal, a Group 13 element, a Group 14 element, a Group 15 element, a Group 16 element, a transition metal, a rare earth element, and a combination thereof but not Si) or a mixture of at least one thereof with $SiO_2$. Examples of Q and R include Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, and a combination thereof.

Figure 2:
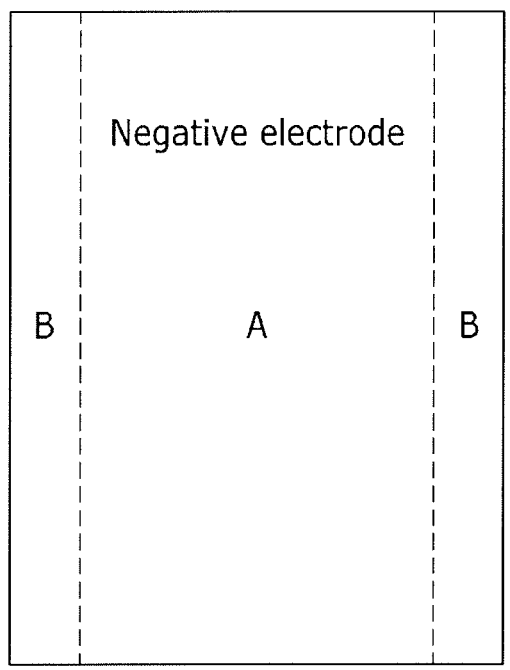
FIG. 2 illustrates an embodiment of active and inactive regions of a negative electrode.
Figure 2:
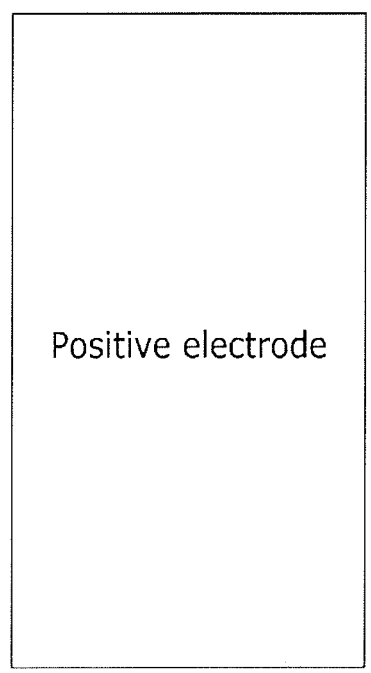

According to one embodiment, the negative electrode may have an active region facing a positive electrode and an inactive region not facing the positive electrode. For example, as shown in FIG. 2, a region (A) of the negative electrode facing the positive electrode is the active region and another region (B) of the negative electrode not facing the positive electrode is the inactive region. The inactive region may correspond to a location where the negative electrode does not face the positive electrode. This is because the negative electrode may be made to be larger than the positive electrode to improve battery safety.

The inactive region may improve safety from the standpoint of a short circuit between positive and negative electrodes due to lithium precipitation on the surface of the negative electrode during charging. Also, the inactive region may be farther away from a moving path of lithium ions transported from the positive electrode, and may have relatively larger resistance of the lithium ions than the active region facing the positive electrode. Thus, in some embodiments, the inactive region may serve as a non-full charge region. However, when the DD value of the inactive region is increased up to greater than or equal to about 19, the lithium ions may be more easily diffused and may decrease the non-full charge region and thus increase battery capacity.

The active region and the inactive region may have a DD value of greater than or equal to about 19, and, for example, about 19 to about 60. According to an embodiment, only the inactive region may have a DD value of greater than or equal to about 19, and, for example, about 19 to about 60. When only the inactive region has a DD value of greater than or equal to about 19, the DD value of the active region may have no limit.

In the negative active material layer, the negative active material may be included in an amount of about 95 wt % to about 99 wt % based on the total weight of the negative active material layer.

In an embodiment, the negative active material layer includes a binder and an optional conductive material. In the negative active material layer, the content of the binder may be about 1 wt % to about 5 wt % based on the total weight of the negative active material layer. When the negative active material layer includes a conductive material, the negative active material layer includes about 90 wt % to about 98 wt % of the negative active material, about 1 wt % to about 5 wt % of the binder, and about 1 wt % to about 5 wt % of the conductive material. The binder may improve binding properties of negative active material particles with one another and with a current collector.

The binder may be a non-aqueous binder, an aqueous binder, or a combination thereof. Examples of the non-aqueous binder include polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, or a combination thereof.

Examples of the aqueous binder include a styrene-butadiene rubber, an acrylated styrene-butadiene rubber (SBR), an acrylonitrile-butadiene rubber, an acrylic rubber, butyl rubber, an ethylenepropylene copolymer, polyepichlorohydrine, polyphosphazene, polyacrylonitrile, polystyrene, an ethylenepropylenediene copolymer, polyvinylpyridine, chlorosulfonated polyethylene, latex, polyesterresin, an acrylic resin, a phenolic resin, an epoxy resin, polyvinyl alcohol, an acrylate-based resin, or a combination thereof.

When the aqueous binder is used as a negative electrode binder, a cellulose-based compound may be further used to provide viscosity as a thickener. Examples of the cellulose-based compound includes one or more of carboxylmethyl cellulose, hydroxypropylmethyl cellulose, methyl cellulose, or alkali metal salts thereof. The alkali metal may be, for example, Na, K, or Li. The thickener may be included in an amount of, for example, about 0.1 parts by weight to about 3 parts by weight based on 100 parts by weight of the negative active material.

The conductive material is included to provide electrode conductivity. Any electrically conductive material may be used as a conductive material unless it causes an adverse chemical change. Examples of the conductive material include a carbon-based material such as natural graphite, artificial graphite, carbon black, acetylene black, ketjen black, a carbon fiber, and the like; a metal-based material of a metal powder or a metal fiber including copper, nickel, aluminum, silver, and the like; a conductive polymer such as a polyphenylene derivative; or a mixture thereof.

The current collector may include, for example, a copper foil, a nickel foil, a stainless steel foil, a titanium foil, a nickel foam, a copper foam, a polymer substrate coated with a conductive metal, and a combination thereof.

In one embodiment, a rechargeable lithium battery may include the negative electrode, a positive electrode, and an electrolyte.

The rechargeable lithium battery may be a high power battery, e.g., the rechargeable lithium battery may be usefully applied to an electronic device requiring high power, e.g., power tool, electric vehicle, vacuum cleaner, or another device. The rechargeable lithium battery including the negative electrode may be suitable for these applications because it easily releases heat generated during charging and discharging operations (and particularly when applied to a high-capacity cell and an electronic device for high power). As a result, deterioration due to the heat may be suppressed and a high power battery may be effectively provided. In addition, the rechargeable lithium battery may easily release heat generated during charging and discharging operations, and may be effectively suppressed from a battery temperature increases. As a result, cycle-life characteristics (and particularly cycle-life characteristics at a high rate) may be effectively improved.

This high power battery may be a cylindrical-shaped battery, a pouch-shaped battery, or a batter of another shape. The cylindrical battery may be, for example, a 18650 battery (diameter of 18 mm, a height of 65 mm) or a 21700 battery (diameter of 21 mm, a height of 70 mm).

The positive electrode may include a positive active material layer formed on a positive current collector. The positive active material may include lithiated intercalation compounds that reversibly intercalate and deintercalate lithium ions. For example, one or more composite oxides of a metal (e.g., cobalt, manganese, nickel, or a combination thereof) and lithium may be used. In some embodiments, compounds represented by one of the following chemical formulae may be used: $Li_aA_{1-b}X_bD_2$ (0.90≤a≤1.8, 0≤b≤0.5); $Li_aA_{1-b}X_bO_{2-c}D_c$ (0.90≤a≤1.8, 0≤b≤0.5, 0≤c≤0.05); $Li_aE_{1-b}X_bO_{2-c}D_c$ (0.90≤a≤1.8, 0≤b≤0.5, 0≤c≤0.05); $Li_aE_{2-b}X_bO_{4-c}D_c$ (0.90≤a≤1.8, 0≤b≤0.5, 0≤c≤0.05); $Li_aNi_{1-b-c}Co_bX_cD_\alpha$ (0.90≤a≤1.8, 0≤b≤0.5, 0<α≤2); $Li_aNi_{1-b-c}Co_bX_cO_{2-\alpha}T_\alpha$ (0.90≤a≤1.8, 0≤b≤0.5, 0≤c≤0.05, 0<α<2); $Li_aNi_{1-b-c}Co_bX_cO_{2-\alpha}T_2$ (0.90≤a≤1.8, 0≤b≤0.5, 0≤c≤0.05, 0<α<2); $Li_aNi_{1-b-c}Mn_bX_cD_\alpha$ (0.90≤a≤1.8, 0≤b≤0.5, 0≤c≤0.05, 0<α≤2); $Li_aNi_{1-b-c}Mn_bX_cO_{2-\alpha}T_\alpha$ (0.90≤a≤1.8, 0≤b≤0.5, 0≤c≤0.05, 0<α<2); $Li_aNi_{1-b-c}Mn_bX_cO_{2-\alpha}T_2$ (0.90≤a≤1.8, 0≤b≤0.5, 0≤c≤0.05, 0<α<2); $Li_aNi_bE_cG_dO_2$ (0.90≤a≤1.8, 0≤b≤0.9, 0≤c≤0.5, 0.001≤d≤0.1); $Li_aNi_bCo_cMn_dG_eO_2$ (0.90≤a≤1.8, 0≤b≤0.9, 0≤c≤0.5, 0≤d≤0.5, 0.001≤e≤0.1); $Li_aNiG_bO_2$ (0.90≤a≤1.8, 0.001≤b≤0.1); $Li_aCoG_bO_2$ (0.90≤a≤1.8, 0.001≤b≤0.1); $Li_aMn_{1-b}G_bO_2$ (0.90≤a≤1.8, 0.001≤b≤0.1); $Li_aMn_2G_bO_4$ (0.90≤a≤1.8, 0.001≤b≤0.1); $Li_aMn_{1-g}G_gPO_4$ (0.90≤a≤1.8, 0≤g≤0.5); $QO_2$; $QS_2$; $LiQS_2$; $V_2O_5$; $LiV_2O_5$; $LiZO_2$; $LiNiVO_4$; $Li_{(3-f)}J_2(PO_4)_3$ (0≤f≤2); $Li_{(3-f)}Fe_2(PO_4)_3$ (0≤f≤2); $Li_aFePO_4$ (0.90≤a≤1.8).

By way of example, in the above chemical formulae, A may be from Ni, Co, Mn, and a combination thereof; X may be Al, Ni, Co, Mn, Cr, Fe, Mg, Sr, V, a rare earth element, and a combination thereof; D may be O, F, S, P, and a combination thereof; E may be Co, Mn, and a combination thereof; T may be F, S, P, and a combination thereof; G may be Al, Cr, Mn, Fe, Mg, La, Ce, Sr, V, and a combination thereof; Q may be Ti, Mo, Mn, and a combination thereof;

Z may be Cr, V, Fe, Sc, Y, and a combination thereof; and J may be V, Cr, Mn, Co, Ni, Cu, and a combination thereof.

The compounds may have a coating layer on the surface or may be mixed with another compound having a coating layer. The coating layer may include at least one of the following: an oxide of a coating element, a hydroxide of a coating element, an oxyhydroxide of a coating element, an oxycarbonate of a coating element, and a hydroxyl carbonate of a coating element. The compound for the coating layer may be, for example, amorphous or crystalline. Examples of the coating element in the coating layer include Mg, Al, Co, K, Na, Ca, Si, Ti, V, Sn, Ge, Ga, B, As, Zr, or a mixture thereof. The coating layer may be disposed in a method having no adverse influence on properties of a positive active material using these elements in the compound. The method may include, for example, spray coating, dipping, or another method.

In the positive electrode, the content of the positive active material may be, for example, about 90 wt % to about 98 wt % based on the total weight of the positive active material layer. In an embodiment, the positive active material layer may further include a binder and a conductive material. The binder and the conductive material may be included, for example, in an amount of about 1 wt % to about 5 wt %, respectively based on the total amount of the positive active material layer.

The binder may improve binding properties of positive active material particles with one another and with a current collector. Examples of the binder include polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene butadiene rubber, an acrylated styrene butadiene rubber, an epoxy resin, and nylon.

The conductive material is included to provide electrode conductivity. Any electrically conductive material may be used as a conductive material unless it causes an adverse chemical change. Examples of the conductive material include a carbon-based material such as natural graphite, artificial graphite, carbon black, acetylene black, ketjen black, and a carbon fiber; a metal-based material of a metal powder or a metal fiber including copper, nickel, aluminum, and silver; a conductive polymer such as a polyphenylene derivative; or a mixture thereof.

The current collector may use Al or another metal or conductive material. The electrolyte may include, for example, a non-aqueous organic solvent and a lithium salt. The non-aqueous organic solvent serves as a medium for transmitting ions taking part in the electrochemical reaction of a battery.

The non-aqueous organic solvent may included a carbonate-based, ester-based, ether-based, ketone-based, alcohol-based, or aprotic solvent. Examples of the carbonate based solvent include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), and butylene carbonate (BC). Examples of the ester-based solvent include methyl acetate, ethyl acetate, n-propyl acetate, dimethylacetate, methylpropionate, ethylpropionate, decanolide, mevalonolactone, and caprolactone. Examples of the ether-based solvent include dibutyl ether, tetraglyme, diglyme, dimethoxyethane, 2-methyltetrahydrofuran, and tetrahydrofuran. The ketone-based solvent may include, for example, cyclohexanone. Examples of the alcohol-based solvent include ethyl alcohol, isopropyl alcohol. Examples of the aprotic solvent include nitriles such as R—CN (where R is a C2 to C20 linear, branched, or cyclic hydrocarbon, a double bond, an aromatic ring, or an ether bond), amides such as dimethylformamide, dioxolanes such as 1,3-dioxolane, sulfolanes, and the like.

The organic solvent may be used alone or in a mixture. When the organic solvent is used in a mixture, the mixture ratio may be controlled in accordance with a desired battery performance.

The carbonate-based solvent may include, for example, a mixture with a cyclic carbonate and a linear carbonate. The cyclic carbonate and linear carbonate are mixed together in a volume ratio of about 1:1 to about 1:9. When the mixture is used as an electrolyte, enhanced performance may be achieved.

The organic solvent may further include an aromatic hydrocarbon-based solvent as well as the carbonate-based solvent. The carbonate-based solvent and aromatic hydrocarbon-based solvent may be mixed together in a volume ratio of, for example, about 1:1 to about 30:1. The aromatic hydrocarbon-based organic solvent may be an aromatic hydrocarbon-based compound represented by Chemical Formula 1.

Chemical Formula 1

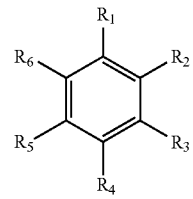

where $R_1$ to $R_6$ are the same or different and are selected from hydrogen, a halogen, a C1 to C10 alkyl group, a haloalkyl group, and a combination thereof.

Examples of the aromatic hydrocarbon-based organic solvent include benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2.3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

The electrolyte may further include an additive of vinylene carbonate, an ethylene carbonate-based compound represented by Chemical Formula 2, or propanesultone to improve a cycle life.

Chemical Formula 2

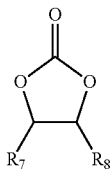

where $R_7$ and $R_8$ are the same or different and may be each independently hydrogen, a halogen, a cyano group (CN), a nitro group ($NO_2$), or a C1 to C5 fluoroalkyl group, provided that at least one of $R_7$ and $R_8$ is a halogen, a cyano group (CN), a nitro group ($NO_2$), or a C1 to C5 fluoroalkyl group, and $R_7$ and $R_8$ are not simultaneously hydrogen.

Examples of the ethylene carbonate-based compound include difluoro ethylenecarbonate, chloroethylene carbonate, dichloroethylene carbonate, bromoethylene carbonate, dibromoethylene carbonate, nitroethylene carbonate, cyanoethylene carbonate, or fluoroethylene carbonate. The amount of the additive for improving cycle life may be flexibly used within an appropriate range.

The lithium salt dissolved in an organic solvent supplies a battery with lithium ions, basically operates the rechargeable lithium battery, and improves transportation of the lithium ions between positive and negative electrodes. Examples of the lithium salt include at least one of the following supporting salts: $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (where x and y are natural numbers, for example integers of 1 to 20), LiCl, LiI, and $LiB(C_2O_4)_2$ (lithium bis(oxalato) borate; LiBOB). A concentration of the lithium salt may range, for example, from about 0.1 M to about 2.0 M. When the lithium salt is included at the above concentration range, an electrolyte may have excellent performance and lithium ion mobility due to optimal electrolyte conductivity and viscosity.

The rechargeable lithium battery may further include a separator between the negative electrode and the positive electrode. The type of separator may depend, for example, on a kind of battery. Examples of separator material include polyethylene, polypropylene, polyvinylidene fluoride, and multi-layers thereof such as but not limited to a polyethylene/polypropylene double-layered separator, a polyethylene/polypropylene/polyethylene triple-layered separator, and a polypropylene/polyethylene/polypropylene triple-layered separator.

Figure 3:
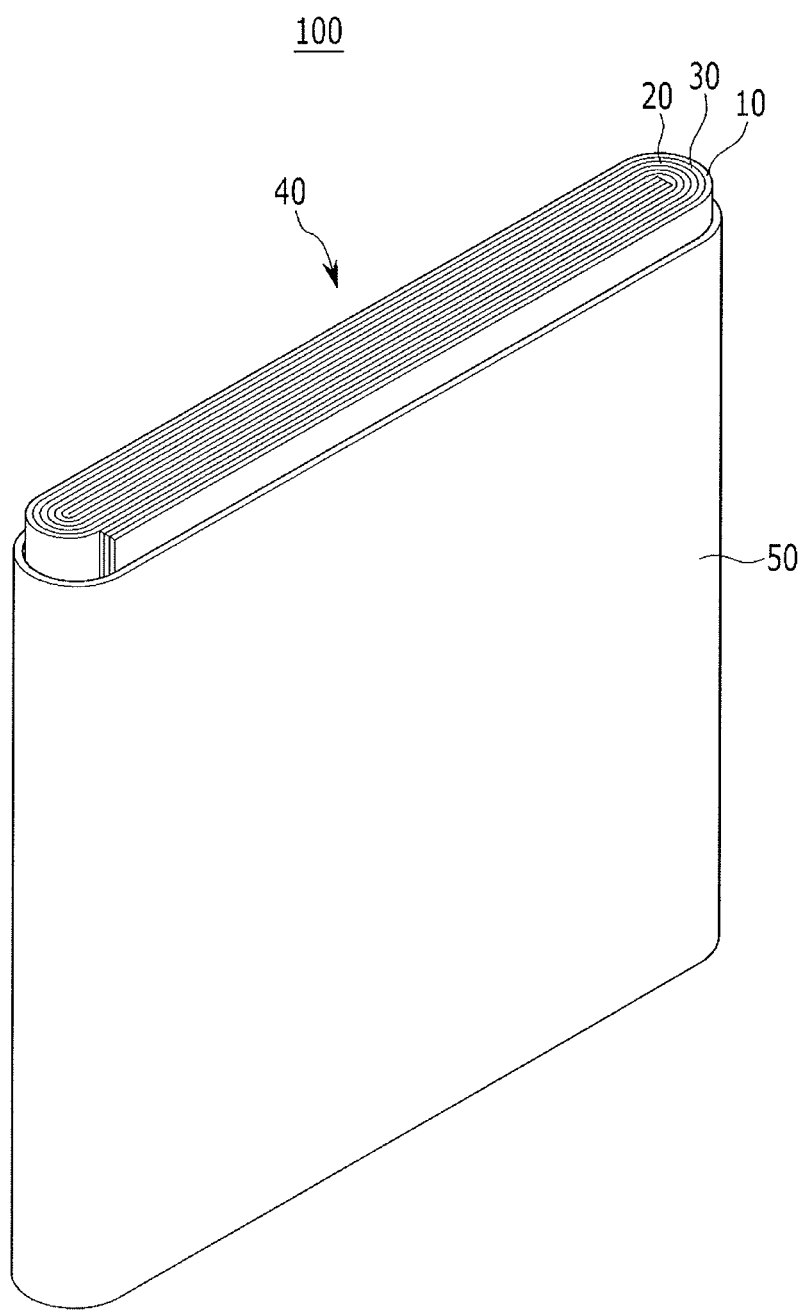
FIG. 3 illustrates an embodiment of a rechargeable lithium battery.

FIG. 3 illustrates an exploded perspective view of an embodiment of a rechargeable lithium battery 100, which in this case is a cylindrical battery.

Referring to FIG. 3, the rechargeable lithium battery 100 includes an electrode assembly 40 manufactured by winding a separator 30 between a positive electrode 10 and a negative electrode 20, and a case 50 housing the electrode assembly 40

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

EXAMPLE EMBODIMENT 1

In this example, 97.5 wt % of artificial graphite, 1.5 wt % of a styrene butadiene rubber, and 1 wt % of carboxylmethyl cellulose were mixed in a water solvent to prepare negative active material slurry having 2300 cps of viscosity (at 25° C.). A Cu foil was disposed on a magnet having a magnetic field strength of 4000 Gauss. The negative active material slurry was coated on the Cu foil while the Cu foil was moved and then exposed to a magnetic field for 9 seconds, dried, and compressed to manufacture a negative electrode having a loading level (L/L) of 12 mg/cm² on one side of the current collector.

Also, 96 wt % of a $LiCoO_2$ positive active material, 2 wt % of a carbon black conductive agent, and 2 wt % of a polyvinylidene fluoride binder were mixed in an N-methyl-pyrrolidone solvent to prepare positive active material slurry. The slurry was coated on an Al substrate, dried, and compressed to manufacture a positive electrode.

The negative and positive electrodes and an electrolyte were used to manufacture a pouch-type full rechargeable lithium battery cell having capacity of 550 mAh and current density of 4.16 mAh/cm². The electrolyte was prepared using a mixed solvent of ethylene carbonate and diethyl carbonate (50:50 of a volume ratio) and dissolving 1 M $LiPF_6$ therein.

EXAMPLE EMBODIMENT 2

A pouch-type rechargeable lithium battery cell was manufactured according to the same method as Example Embodiment 1, by manufacturing the negative electrode having a loading level (L/L) of 12 mg/cm² on one side of the current collector, except for changing the exposure time to a magnetic field from 9 seconds to 3 seconds.

EXAMPLE EMBODIMENT 3

A pouch-type rechargeable lithium battery cell was manufactured according to the same method as Example Embodiment 1, by manufacturing the negative electrode having a loading level (L/L) of 12 mg/cm² on one side of the current collector, except for changing the exposure time to a magnetic field from 9 seconds to 5 seconds.

EXAMPLE EMBODIMENT 4

A pouch-type rechargeable lithium battery cell was manufactured according to the same method as Example Embodiment 1, by manufacturing the negative electrode having a loading level (L/L) of 12 mg/cm² on one side of the current collector, except for changing the magnetic field strength from 4000 Gauss to 5000 Gauss.

COMPARATIVE EXAMPLE 1

In this example, 97.5 wt % of artificial graphite, 1.5 wt % of a styrene butadiene rubber, and 1 wt % of carboxylmethyl cellulose were mixed in a water solvent to prepare negative active material slurry having viscosity of 2300 cps (at 25° C.). The negative active material slurry was coated on a Cu foil, dried, and compressed to manufacture a negative electrode having a loading level (L/L) of 12 mg/cm² on one side of the current collector. The negative electrode was used along with the positive electrode and the electrolyte solution used in Example Embodiment 1 to manufacture a pouch-type rechargeable lithium battery cell.

COMPARATIVE EXAMPLE 2

A pouch-type rechargeable lithium battery cell was manufactured according to the same method as Example Embodiment 1, by manufacturing the negative electrode having a surface loading level (L/L) of 12 mg/cm$^2$ on one side of the current collector, except for changing the exposure time to a magnetic field from 9 seconds to 2 seconds.

COMPARATIVE EXAMPLE 3

A pouch-type rechargeable lithium battery cell was manufactured according to the same method as Example Embodiment 1, by manufacturing the negative electrode having a surface loading level (L/L) of 12 mg/cm$^2$ on one side of the current collector, except for changing the exposure time to a magnetic field from 9 seconds to 10 seconds and the magnetic field strength from 4000 Gauss to 5000 Gauss.

REFERENCE EXAMPLE 1

A pouch-type rechargeable lithium battery cell was manufactured according to the same method as Example Embodiment 1, by manufacturing the negative electrode having a loading level (L/L) of 12 mg/cm$^2$ on one side of the current collector, except for changing the exposure time to a magnetic field from 9 seconds to 2 seconds and viscosity of the negative active material slurry from 2300 cps to 2700 cps.

EXAMPLE EMBODIMENT 5

A pouch-type rechargeable lithium battery cell was manufactured according to the same method as Example Embodiment 1, by manufacturing the negative electrode having a surface loading level (L/L) of 12 mg/cm$^2$ on one side of the current collector, except for changing the magnetic field strength from 4000 Gauss to 3800 Gauss.

COMPARATIVE EXAMPLE 4

A pouch-type rechargeable lithium battery cell was manufactured according to the same method as Example Embodiment 1, by manufacturing the negative electrode having a loading level (L/L) of 12 mg/cm$^2$ on one side of the current collector, except for changing the exposure time to a magnetic field strength from 9 seconds to 1 second.

EXAMPLE EMBODIMENT 6

In this example, 97.5 wt % of artificial graphite, 1.5 wt % of a styrene butadiene rubber, and 1 wt % of carboxylmethyl cellulose were mixed in a water solvent to prepare negative active material slurry having viscosity of 2300 cps (at 25° C.). A Cu foil was disposed on a magnet having a magnetic field strength of 4000 Gauss. The negative active material slurry was coated on the Cu foil while the Cu foil was moved and then exposed to a magnetic field for 9 seconds, dried, and compressed to manufacture a negative electrode having a loading level (L/L) of 12 mg/cm$^2$ on one side of the current collector.

Also, 96 wt % of a LiCoO$_2$ positive active material, 2 wt % of a carbon black conductive agent, and 2 wt % of a polyvinylidene fluoride binder were mixed in an N-methylpyrrolidone solvent to prepare positive active material slurry. The slurry was coated on an Al substrate, dried, and compressed to manufacture a positive electrode.

The negative and positive electrodes were used along with an electrolyte to manufacture a cylindrical full rechargeable lithium battery cell having capacity of 2.5 A. The electrolyte was prepared by dissolving 1 M LiPF$_6$ in a mixed solvent of ethylene carbonate and diethyl carbonate (50:50 of a volume ratio).

COMPARATIVE EXAMPLE 5

In this example, 97.5 wt % of artificial graphite, 1.5 wt % of a styrene butadiene rubber, and 1 wt % of carboxylmethyl cellulose were mixed in a water solvent to prepare negative active material slurry having viscosity of 2300 cps (at 25° C.). The negative active material slurry was coated on a Cu foil, dried, and compressed to manufacture a negative electrode having a loading level (L/L) of 12 mg/cm$^2$ on one side of the current collector. The negative electrode was used along with the positive electrode and the electrolyte used in Example Embodiment 6 to manufacture a cylindrical rechargeable lithium battery cell having capacity of 2.5 A.

COMPARATIVE EXAMPLE 6

A cylindrical rechargeable lithium battery was manufactured according to the same method as Comparative Example 2, by manufacturing the negative electrode having a loading level (L/L) of 12 mg/cm$^2$ on one side of the current collector, except for changing the exposure time to a magnetic field from 2 seconds to 1.5 seconds and viscosity of the negative active material slurry from 2300 cps to 2700 cps.

X-ray Diffraction Characteristics

The rechargeable lithium battery cells according to Example Embodiment 1 and Comparative Example 1 were twice charged and discharged at 0.1 C and then completely discharged to 2.75 V at 0.1 C. The completely-discharged battery cells were disassembled to obtain negative electrodes. As for these negative electrodes, an X'Pert (PANalytical B.V.) XRD equipment using a CuKα ray as a target ray was used, but a monochromator equipment was removed in order to improve a peak intensity resolution. The measurement was performed under a condition of 2θ=10° to 80°, a scan speed (°/S)=0.06436, and a step size of 0.026°/step.

Figure 4:
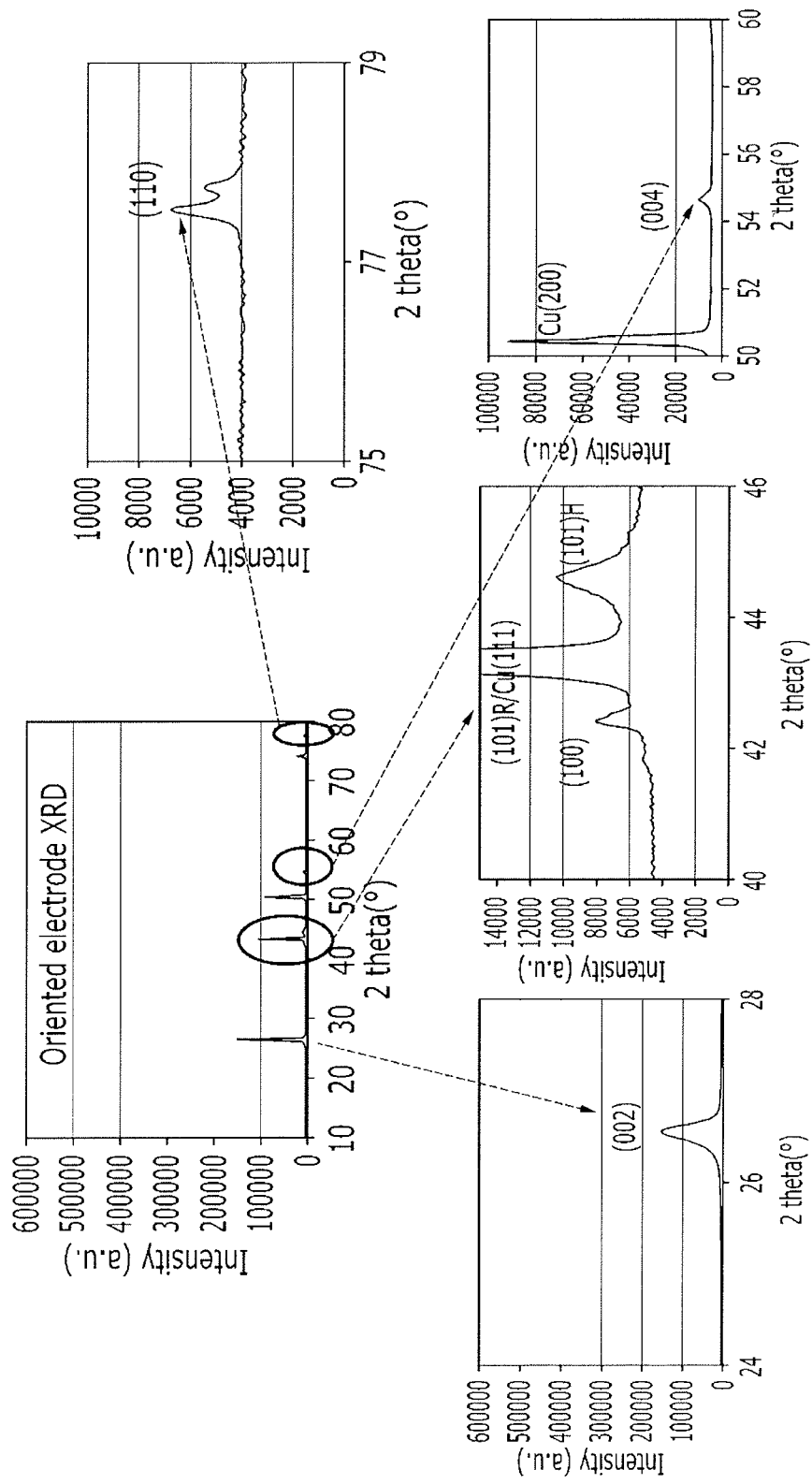
FIG. 4 illustrates an example embodiment of XRD peaks of a negative electrode.
Figure 5:
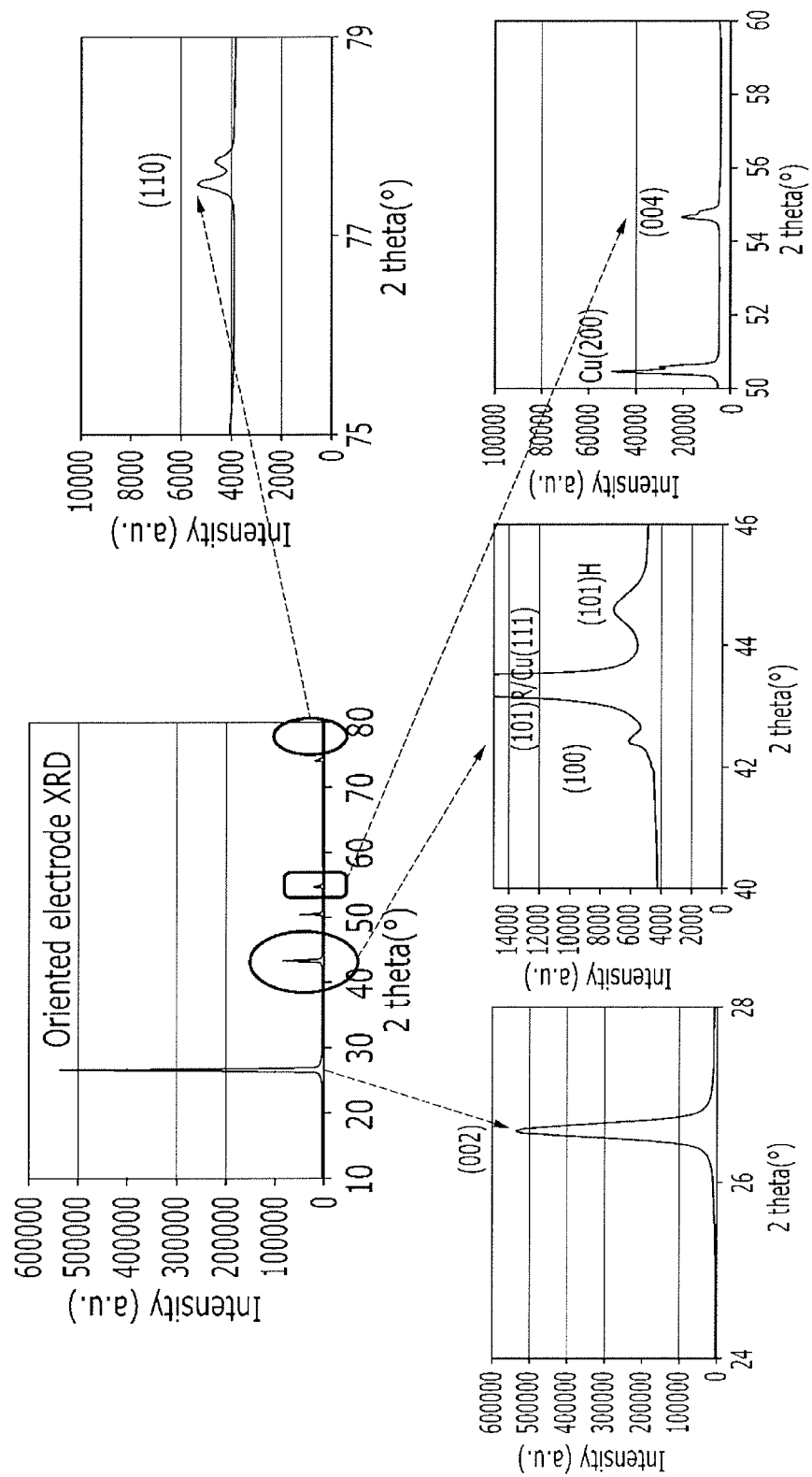
FIG. 5 illustrates a comparative example of XRD peaks of a negative electrode.

The measured XRD results are shown in FIG. 4 (Example Embodiment 1) and FIG. 5 (Comparative Example 1). As shown in FIGS. 4 and 5, the negative electrode of Comparative Example 1 showed a higher peak at 2θ=26.5±0.2° than the negative electrode of Example Embodiment 1. In addition, as shown in FIGS. 4 and 5, the negative electrodes of Example Embodiment 1 and Comparative Example 1 showed a peak at 2θ=26.5±0.2° ((002) plane), 42.4±0.2° ((100) plane), 43.4±0.2° ((101)R plane), 44.6±0.2° ((101) H plane), 54.7±0.2° ((004) plane), and 77.5±0.2° ((110) plane).

As shown in FIGS. 4 and 5, the areas of the peaks shown at 2θ=26.5±0.2° ((002) plane), 42.4±0.2° ((100) plane), 43.4±0.2° ((101) R plane), 44.6±0.2° ((101) H plane), 54.7±0.2° ((004) plane), and 77.5±0.2° ((110) plane) were measured and the results are shown in Table 1. In addition, the area sum of peaks shown at 2θ=42.4±0.2° ((100) plane), 43.4±0.2° ((101)R plane), 44.6±0.2° ((101)H plane), and 77.5±0.2° ((110) plane) as $I_a$, and the area sum of peaks shown at 2θ=26.5±0.2° ((002) plane), 42.4±0.2° ((100) plane), 43.4±0.2° ((101)R plane), 44.60.2° ((101)H plane), 54.7±0.2° ((004) plane), and 77.5±0.2° ((110) plane) as $I_{total}$, are shown in Table 1. DD values ($I_{total}/I_a$) were obtained from calculations based on the values in Table 1. Furthermore, $I_{(004)}/I_{(002)}$ and $I_{(110)}/I_{(004)}$ were calculated and are shown in Table 1, and in particular peaks corresponding to a (101)R plane of graphite and a (111) plane of a Cu current collector at 43.40.2° overlapped.

In addition, the X-ray diffraction characteristics of Comparative Example 6 were measured as the same method as above. The results are shown in Table 1.

TABLE 1

| | | Peak area | | |
|---|---|---|---|---|
| 2θ | Peak plane (peak index) | Comparative Example 1 | Example Embodiment 1 | Comparative Example 6 |
| 26.5 ± 0.2° | (002) | 82472.39 | 25645.53 | 41253.6 |
| 42.4 ± 0.2° | (100) | 262.05 | 496.89 | 215.5 |
| 43.4 ± 0.2° | (101)R | 12615.36 | 14684.67 | 7426.2 |
| 44.6 ± 0.2° | (101)H | 965.65 | 2461.94 | 1052.3 |
| 54.7 ± 0.2° | (004) | 2698.36 | 1415.31 | 2125.3 |
| 77.5 ± 0.2° | (110) | 246.98 | 563.02 | 842.3 |
| | $I_{total}$ | 99260.79 | 45267.36 | 52915.2 |
| | $I_a$ | 14090.04 | 18206.52 | 9536.3 |
| | DD | 14.19 | 40.22 | 18.02 |
| | $I_{(004)}/I_{(002)}$ | 0.033 | 0.055 | 0.052 |
| | $I_{(110)}/I_{(004)}$ | 0.09153 | 0.397807 | 0.396321 |

As shown in Table 1, the negative electrode of Example Embodiment 1 showed a DD value of greater than or equal to about 19, but the negative electrode of Comparative Example 1 showed a DD value of less than 19. Also, the negative electrode of Example Embodiment 1 showed $I_{(004)}/I_{(002)}$ of greater than or equal to 0.04, but the negative electrode of Comparative Example 1 showed $I_{(004)}/I_{(002)}$ of less than 0.04. In addition, the negative electrode of Example Embodiment 1 showed $I_{(110)}/I_{(004)}$ of greater than or equal to 0.3, while the negative electrode of Comparative Example 1 showed $I_{(110)}/I_{(004)}$ of less than 0.3.

Since the negative electrode of Comparative Example 6 showed $I_{(110)}/I_{(004)}$ of greater than or equal to 0.3 but a DD value of less than 19, a negative electrode showing $I_{(110)}/I_{(004)}$ of greater than or equal to 0.3 did not necessarily show a DD value of greater than or equal to about 19.

XRD of the rechargeable lithium battery cells according to Examples Embodiments 2 to 5, Comparative Examples 2 to 4, and Reference Example 1 was measured in the same method as the cells according to Example Embodiment 1 and Comparative Example 1. From the results, DD values and $I_{(004)}/I_{(002)}$ were obtained and are shown in Table 2.

TABLE 2

| | DD value | $I_{(004)}/I_{(002)}$ |
|---|---|---|
| Example Embodiment 2 | 19 | 0.041 |
| Example Embodiment 3 | 33.5 | 0.045 |
| Example Embodiment 4 | 60 | 0.043 |
| Example Embodiment 5 | 40 | 0.042 |
| Comparative Example 2 | 18.5 | 0.041 |
| Comparative Example 3 | 60.5 | 0.042 |
| Comparative Example 4 | 18 | 0.044 |
| Reference Example 1 | 19 | 0.035 |

As shown in Table 2, the negative electrodes of Examples Embodiments 2 to 5 showed a DD value of greater than or equal to about 19 and less than or equal to about 60 and $I_{004}/I_{(002)}$ of greater than or equal to 0.04. The negative electrodes of Comparative Examples 2 to 4 and Reference Example 1 showed a DD value of less than 19 (Comparative Examples 2 and 4) or greater than 60 (Comparative Example 3) and $I_{(004)}/I_{(002)}$ of less than 0.04 (Reference Example 1).

BET Measurement

The rechargeable lithium battery cells according to Examples Embodiments 1 to 6, Comparative Examples 1 to 5, and Reference Example 1 were charged and discharged at 0.1 C and completely discharged to 3 V, and then disassembled to obtain negative electrodes. The negative electrodes were respectively used to obtain each 5 cm×5 cm size sample, these samples were respectively cut into a size of 0.5 cm×0.5 cm and put in a BET sample holder. Then, their BETs were measured in a nitrogen gas adsorption method, and the results are shown in Table 3.

TABLE 3

| | BET (m²/g) |
|---|---|
| Example Embodiment 1 | 0.71 |
| Example Embodiment 2 | 0.72 |
| Example Embodiment 3 | 0.75 |
| Example Embodiment 4 | 0.85 |
| Example Embodiment 5 | 0.89 |
| Example Embodiment 6 | 0.79 |
| Comparative Example 1 | 0.85 |
| Comparative Example 2 | 0.82 |
| Comparative Example 3 | 0.74 |
| Comparative Example 4 | 0.76 |
| Comparative Example 5 | 0.89 |
| Reference Example 1 | 0.76 |

As shown in Table 3, the specific surface areas of the negative electrodes according to Examples Embodiments 1 to 6, Comparative Examples 1 to 5, and Reference Example 1 were all less than 5.0 m²/g.

DC-IR (Direct Current Internal Resistance)

Figure 6:
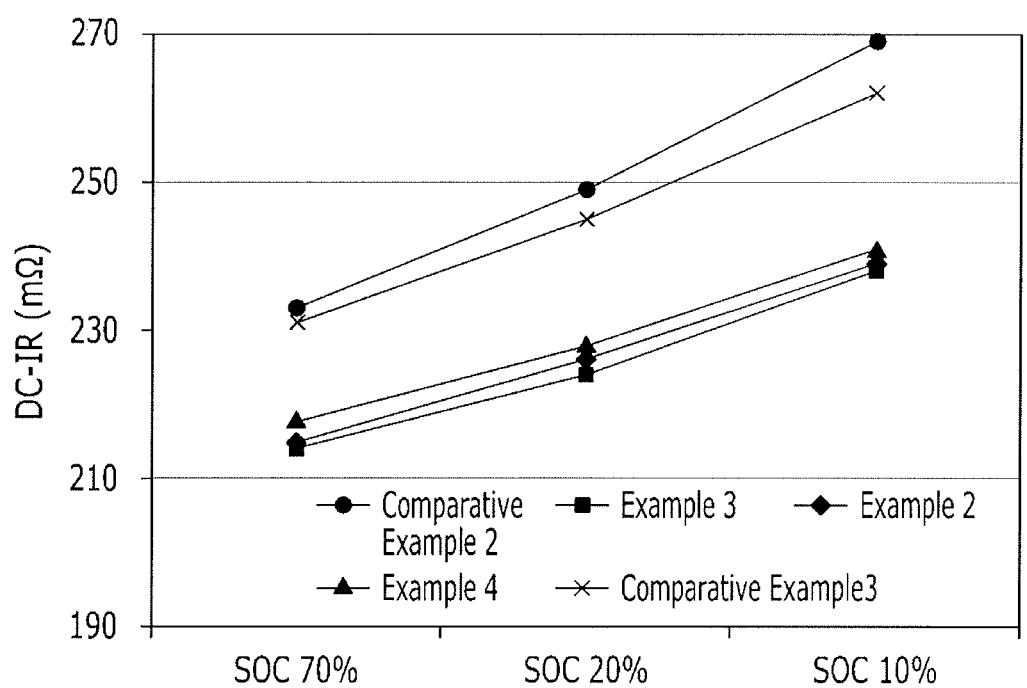
FIG. 6 illustrates DC internal resistance (DC-IR) of rechargeable lithium battery cells according to Examples Embodiments and Comparative Examples.
Figure 7:
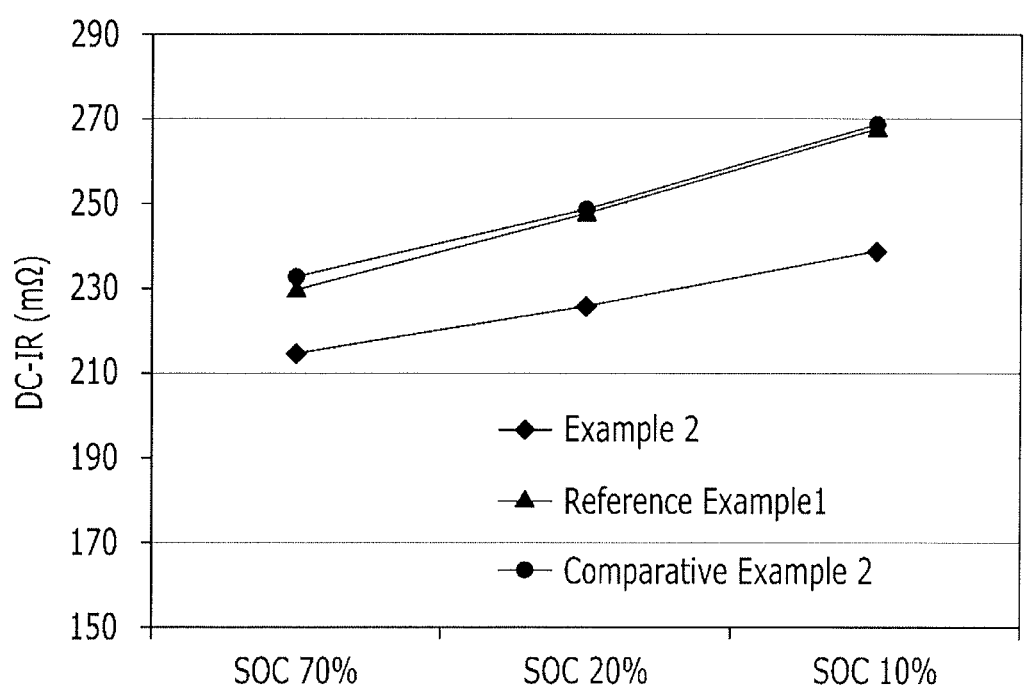
FIG. 7 illustrates DC internal resistance (DC-IR) of rechargeable lithium battery cells according to Example Embodiments and Comparative Examples.

The rechargeable lithium battery cells according to Examples Embodiments 2 to 5, Comparative Examples 2 to 4, and Reference Example 1 were evaluated under a 0.1 C charge and discharge condition, and their discharge capacities were first confirmed and regarded as a 1 C reference. After confirming the discharge capacities, DC internal resistance (DC-IR) was evaluated by 0.025 C cut-off charging the battery cells at 0.7 C under CCCV (constant current/constant voltage) and discharging the battery cells at 0.1 C and measuring a voltage drop (V) while a current flew at 1 C for 1 second under a SOC condition such as SOC70 (charged to be 70% of charge capacity based on 100% of entire battery charge capacity, which is 30% discharged in a discharge state), SOC20 (charged to be 20% of charge capacity based on 100% of entire battery charge capacity, which is 80% discharged in a discharge state), and SOC10 (charged to be 10% of charge capacity based on 100% of entire battery charge capacity, which is 90% discharged in a discharge state). The results for Examples Embodiments 2 to 4 and Comparative Examples 2 and 3 are shown in FIG. 6, and the result for Reference Example 1 is shown in FIG. 7. In addition, the results for Example Embodiment 2 and Comparative Example 2 are also shown in FIG. 7 for comparison.

As shown in FIGS. 6 and 7, the negative electrodes of Examples Embodiments 2 and 3 showed a DD value of greater than or equal to about 19 but less than or equal to about 60 and thus lower DC internal resistance under the SOC condition than Comparative Examples 2 and 3 and Reference Example 1.

In addition, a ratio of DC internal resistance at SOC10 relative to DC internal resistance at SOC70 was calculated, and the results of Example Embodiment 5 and Comparative Example 4 among the results are shown in Table 4.

TABLE 4

| | DC-IR ratio (SOC10/SOC70, %) |
|---|---|
| Comparative Example 4 | 1.28 |
| Example Embodiment 5 | 1.19 |

As shown in Table 4, Example Embodiment 5 showed a lower ratio of DC internal resistance at SOC10 relative to DC internal resistance at SOC70 than Comparative Example 4. Also, DC internal resistance was increased by a lesser amount according to a charge state.

Rate Capability

Figure 8:
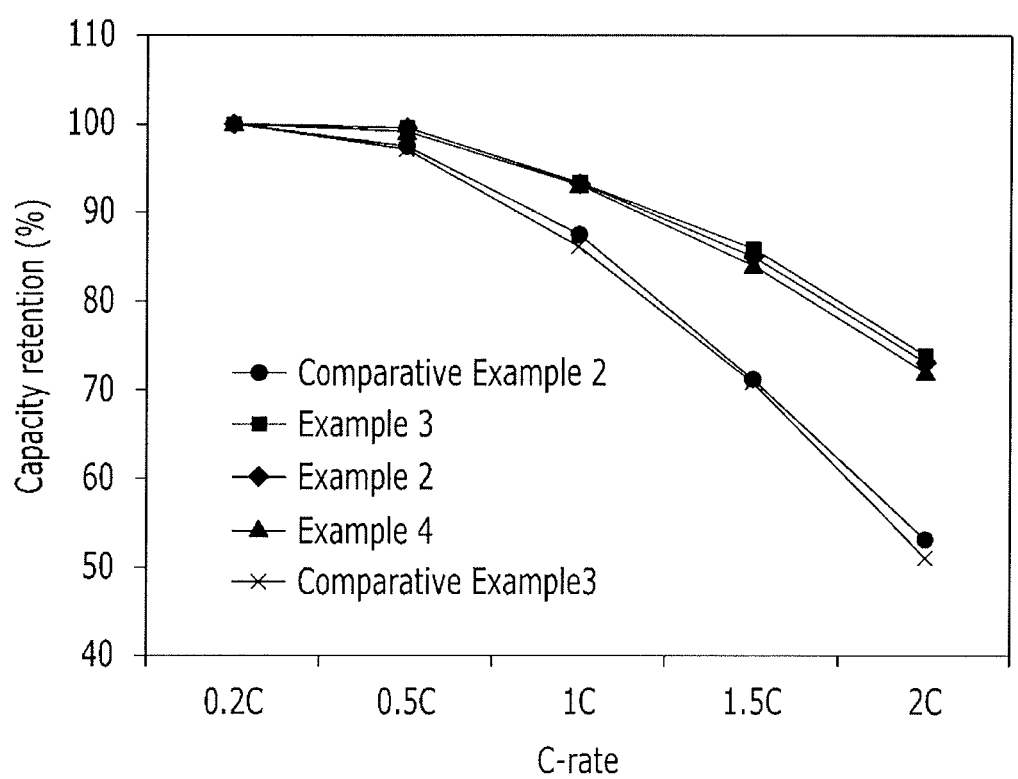
FIG. 8 illustrates charge capacity of rechargeable lithium battery cells according to Example Embodiments and Comparative Examples.
Figure 9:
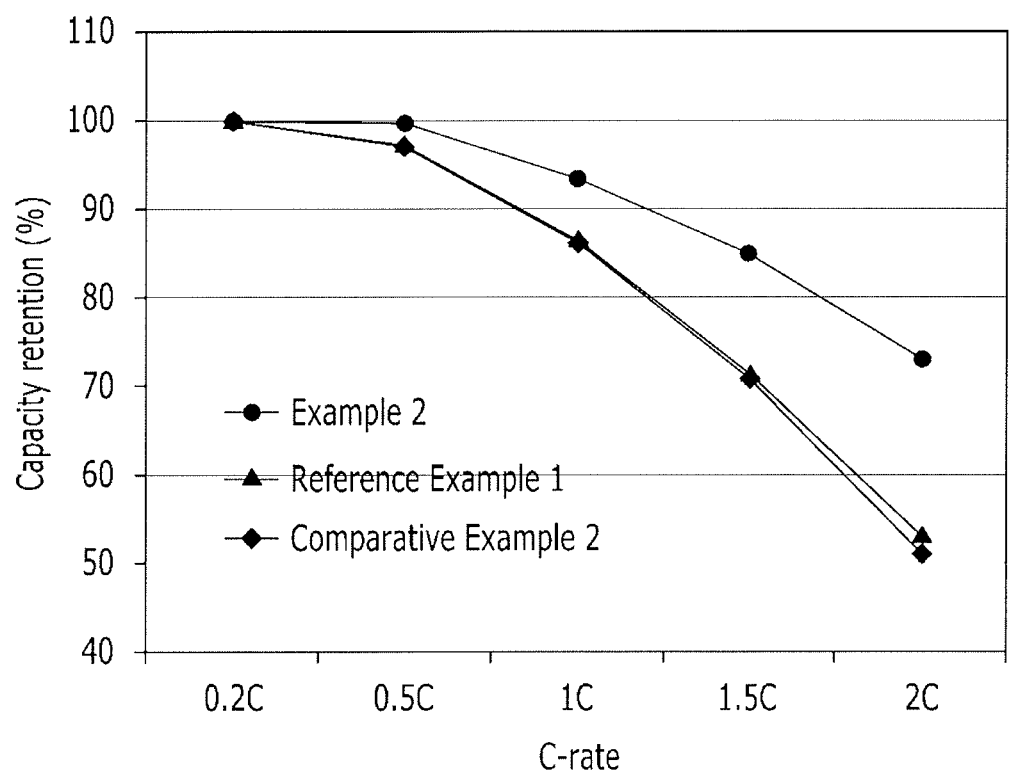
FIG. 9 illustrates charge capacity of rechargeable lithium battery cells according to Example Embodiments and Comparative Examples.

The full cells according to Examples Embodiments 2 to 4, Comparative Examples 2 and 3, and Reference Example were respectively charged once and discharged at each 0.2 C, 0.5 C, 1 C, 1.5 C, and 2 C. Their capacity ratios at each C-rate relative to 0.2 C discharge capacity were then calculated. The results for Examples Embodiment 2 to 4 and Comparative Examples 2 and 3 are shown in FIG. 8, and the result for Reference Example 1 is shown in FIG. 9. In addition, the results for Example Embodiment 2 and Comparative Example 2 are shown in FIG. 9 for comparison.

As shown in FIGS. 8 and 9, the negative electrodes of Examples Embodiments 2 and 3 showed a DD value of greater than or equal to about 19 but less than or equal to 60. Thus, excellent capacity retention were achieved at all C-rates compared with the negative electrodes of Comparative Examples 2 to 4.

Cycle-life Characteristics

The full cells of Examples Embodiments 2 to 4, Comparative Examples 2 and 3, and Reference Example 1 were respectively constant current/constant voltage charged under a condition of 1.0 C, 4.4 V, and 0.1 C cut-off, paused for 5 minutes, constant current discharged under a condition of 1.0 C and 3.0 V cut-off and paused for 5 minutes as a one cycle, and this cycle was 400 times repeated. A capacity retention depending on a charge and discharge cycle was evaluated by calculating a discharge capacity ratio at each cycle relative to discharge capacity at the first cycle. The results are illustrated in FIG. 10.

Figure 10:
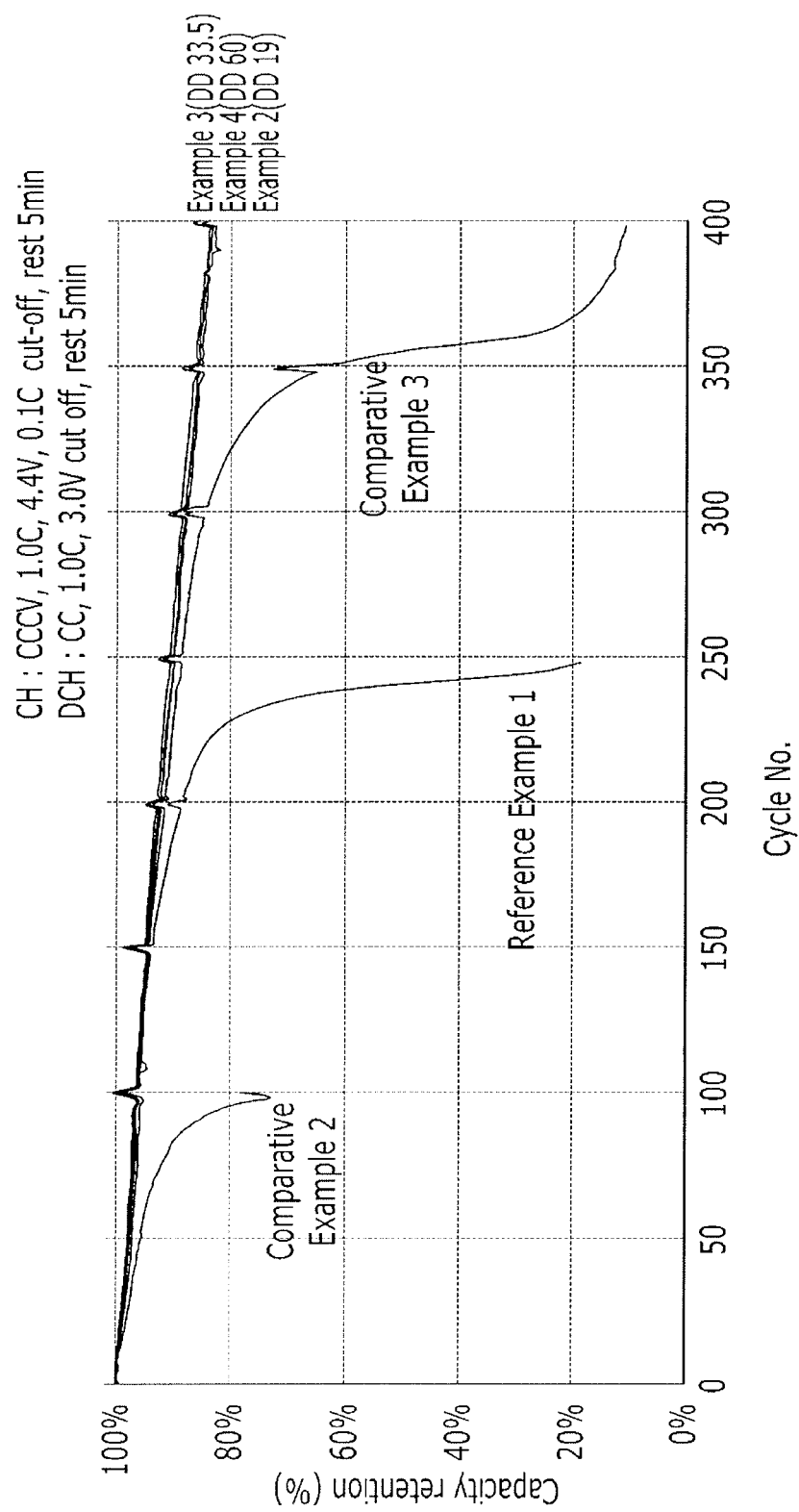
FIG. 10 illustrates cycle-life characteristics of rechargeable lithium battery cells according to Example Embodiments and Comparative Examples.

As shown in FIG. 10, the negative electrodes of Example Embodiments 2 and 3 showing a DD value of greater than or equal to about 19 but less than or equal to 60 maintained a capacity retention of greater than or equal to 80% even at the $400^{th}$ cycle. The negative electrode of Comparative Example 2 showed a capacity retention of less than 80% even at the $100^{th}$ cycle. The negative electrode of Reference Example 1 showed a capacity retention of less than 80% even at the $230^{th}$ cycle. The negative electrode of Comparative Example 3 showed a capacity retention of less than 80% even at the $330^{th}$ cycle, and that is, the capacity retention was rapidly decreased.

Lithium Precipitation Evaluation

The rechargeable lithium battery cells according to Comparative Example 2 and Example Embodiment 3 were full-charged at 0.7 C. After disassembling the negative electrodes therefrom, lithium precipitation on the surface of negative electrodes was then examined. The results are shown in FIG. 11.

Figure 11:
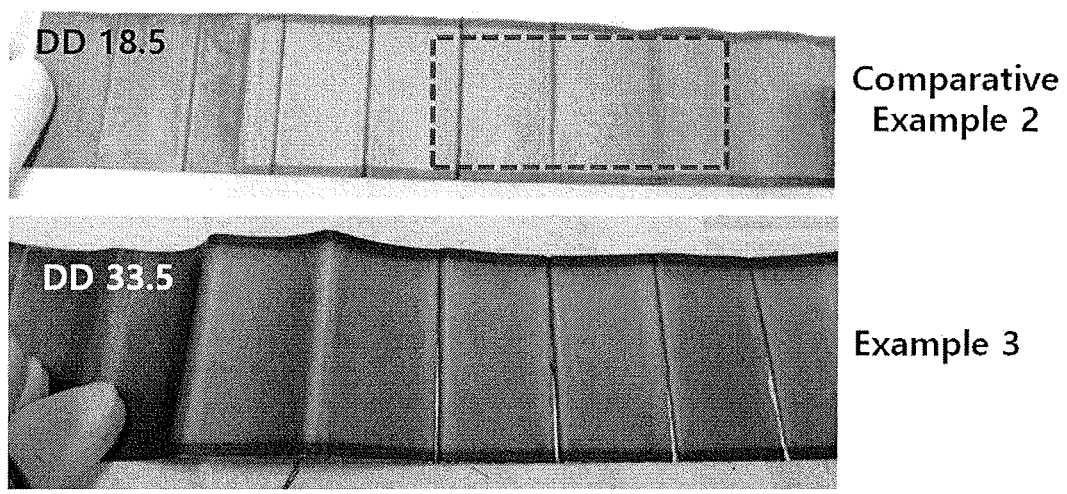
FIG. 11 is a photograph of the surface of negative electrodes obtained after full-charging and disassembling rechargeable lithium battery cells.

As shown in FIG. 11, lithium precipitation was found on the surface of the negative electrode of Comparative Example 2. Lithium precipitation was not found on the surface of the negative electrode of Example Embodiment 3. As shown above, no lithium precipitation means that there is small resistance when lithium ions are inserted into a negative electrode. Accordingly, since the resistance of the negative electrode is decreased through orientation, lithium precipitation is suppressed. Suppressed lithium precipitation may improve battery stability and suppress depletion of electrolyte solution due to continuous decomposition of the electrolyte solution. As a result, battery electrochemical characteristics (e.g., cycle-life) may be improved.

Expansion Rate Capability

The rechargeable lithium battery cells according to Example Embodiment 5 and Comparative Example 4 were evaluated under a 0.1 C charge and discharge condition. Discharge capacities of the cells were confirmed and regarded as a 1 C reference.

Then, the battery cells were 0.025 C cut-off charged at 0.7 C CCCV (constant current constant voltage) and discharged at 0.1 C, then cut-off at 0.7 C CCCV and 0.025 C, and then fully charged to be SOC100 (charged to be 100% of charge capacity based on 100% of the entire battery charge capacity, e.g., 0% discharged), and disassembled to measure the thickness of each electrode plate in the full charge state. This thickness was compared with the thickness of the electrode plate after compression and vacuum-drying. The results are shown in Table 5.

TABLE 5

| | Swelling ratio (SOC100, %) |
|---|---|
| Comparative Example 4 | 19.4 |
| Example Embodiment 5 | 15.5 |

As shown in Table 5, the rechargeable lithium battery cell of Example Embodiment 5 showed a smaller swelling ratio than that of Comparative Example 4. The reason is that an electrode is oriented non-parallel to a current collector and thus contracted and expanded in X-axis and Y-axis directions, rather than a Z-axis direction, during repetitive charging and discharging. This is different from other electrodes which have been proposed, which are oriented parallel to a current collector and therefore which contract and expand in the Z-axis direction during repetitive charging and discharging operations. In addition, when the electrode is completely vertically oriented with the current collector, the electrode contracts and expands in the X-axis and Y-axis directions, and thus may cause deformation of a battery cell. However, the cell of Example Embodiment 5 was not deformed because the cell had no completely vertical orientation.

Thermal Diffusivity and Penetration Evaluation

Figure 12:
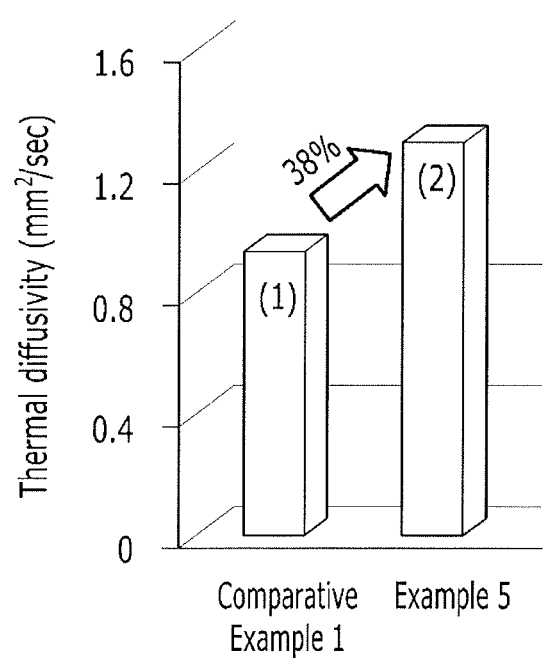
FIG. 12 illustrates thermal diffusivity of the negative electrodes according to Example Embodiments and Comparative Examples.

Thermal diffusivity of the negative electrodes according to Example Embodiment 5 and Comparative Example 1 was measured, and the results are shown in FIG. 12. The thermal diffusivity was measured in a Xenon flash method. The Xenon flash method was performed according to ASTM E1461 by locating a negative electrode inside a furnace maintained at 25° C., radiating xenon flashlight on one surface of the negative electrode with energy of 10 J/pulse to heat the negative electrode, and then measuring the thermal diffusivity with a nitrogen-cooled InSb IR detector when a temperature was increased in an opposite of the negative electrode, and herein, a LFA-447 (NETZSCH, Germany) equipment was used. As shown in FIG. 12, Example Embodiment 5 showed 38% improved thermal diffusivity. Accordingly, excellent thermal conductivity (=thermal diffusivity×specific heat×density) was achieved relative to Comparative Example 1.

In addition, each ten rechargeable lithium battery cells according to Example Embodiment 5 and the Comparative Example 1 was manufactured to conduct a penetration experiment, and the results are shown in Table 6. The penetration experiment was performed by respectively charging the rechargeable lithium battery cells at 0.5 C up to 4.2 V for 3 hours, pausing for about 10 minutes (up to 72 hours), and then, penetrating the center of the cells with a pin having a diameter of 5 mm at 60 Mm/sec.

As shown in FIG. 12, Example Embodiment 5 showed 38% improved thermal diffusivity and thus easily discharged heat generated thereby compared with Comparative Example 1.

TABLE 6

|  | OK (L1 mode) | NG (L4 mode) |
|---|---|---|
| Comparative Example 1 | 6 cells | 4 cells |
| Example Embodiment 5 | 10 cells | 0 cell |

In Table 6, L1 corresponds to a case where a short circuit occurs, ignition does not occur, and L4 corresponds to a case of ignition due to a short circuit.

Also, as shown in Table 6, all the ten cells in L1 mode for Example Embodiment 5 turned out to be OK. Six cells out of ten cells in L1 mode for Comparative Example 1 turned out to be OK, but the remaining four cells in L4 mode for Comparative Example 1 turned out to be NG. Accordingly, Example Embodiment 5 showed excellent battery safety compared with Comparative Example 1. As shown in FIG. 12, this result is obtained because the negative electrode of Example Embodiment 5 showed higher thermal diffusivity than the negative electrode of Comparative Example 1, and thus fast discharged heat generated during penetration, and was suppressed from ignition due to thermal runaway.

Thermal Stability Evaluation

Surface temperature of the cylindrical rechargeable lithium battery cells according to Example Embodiment 6 and Comparative Example 5 was measured, while the cells were discharged with a 30 A constant current at 12 C. The results are shown in Table 7.

TABLE 7

|  | Maximum Temperature (° C.) |
|---|---|
| Comparative Example 5 | 120 |
| Example Embodiment 6 | 100 |

As shown in Table 7, Example Embodiment 6 showed a lower maximum temperature during the discharge than Comparative Example 5. As shown in FIG. 12, the reason is that the negative electrode of Example Embodiment 5 showed higher thermal diffusivity than Comparative Example 1, and thus fast discharged heat generated during the penetration, and also was suppressed from a battery temperature increase.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise indicated. Accordingly, various changes in form and details may be made without departing from the spirit and scope of the embodiments set forth in the claims.

What is claimed is:

1. A negative electrode for a rechargeable lithium battery, comprising
    a current collector; and
    a negative active material layer on the current collector and including a carbon-based negative active material, wherein a Degree of Divergence (DD) value of the negative electrode defined by Equation 1 is 19 to 60:

$$DD(\text{Degree of Divergence}) = (I_a/I_{total})*100 \quad (1)$$

wherein:
    $I_a$ is a sum of peak intensities at $2\theta=42.4\pm0.2°$, $43.4\pm0.2°$, $44.6\pm0.2°$, and $77.5\pm0.2°$ measured by XRD using a CuKα ray, and
    $I_{total}$ is a sum of peak intensities at $2\theta=26.5\pm0.2°$, $42.4\pm0.2°$, $43.4\pm0.2°$, $44.6\pm0.2°$, $54.7\pm0.2°$, and $77.5\pm0.2°$ measured by XRD using a CuKα ray.

2. The negative electrode as claimed in claim 1, wherein a BET specific surface area of the negative electrode is less than about 5.0 m²/g.

3. The negative electrode as claimed in claim 1, wherein the negative electrode has a level (L/L) of a single negative active material layer of about 6 mg/cm² to about 65 mg/cm².

4. The negative electrode as claimed in claim 1, wherein the peak intensity is a peak integral area value.

5. The negative electrode as claimed in claim 1, wherein the negative electrode has a ratio $(I_{(004)}/I_{(002)})$ of a peak intensity at a (004) plane relative to a peak intensity at a (002) plane of greater than or equal to about 0.04 measured by XRD using a CuKα ray.

6. The negative electrode as claimed in claim 1, wherein the negative electrode has a ratio $(I_{(004)}/I_{(002)})$ of a peak intensity at a (004) plane relative to a peak intensity at a (002) plane of greater than or equal to about 0.04 and less than or equal to about 0.07 measured by XRD using a CuKα ray.

7. The negative electrode as claimed in claim 1, wherein the carbon-based negative active material is artificial graphite or a mixture of artificial graphite and natural graphite.

8. The negative electrode as claimed in claim 1, wherein the negative active material layer includes a Si-based negative active material, a Sn-based negative active material, a lithium vanadium oxide, or a combination thereof.

9. The negative electrode as claimed in claim 1, wherein:
    the negative electrode has an active region facing a positive electrode and an inactive region not facing the positive electrode, and
    a DD value of the inactive region is 19 to 60.

10. A rechargeable lithium battery, comprising
the negative electrode as claimed in claim 1;
a positive electrode including a positive active material; and
an electrolyte.

11. The rechargeable lithium battery as claimed in claim 10, wherein the rechargeable lithium battery is a high power battery.

12. The rechargeable lithium battery as claimed in claim 10, wherein the rechargeable lithium battery is a cylindrical battery or a pouch type battery.

13. The rechargeable lithium battery as claimed in claim 12, wherein the cylindrical battery is a 18650 type cylindrical battery or a 21700 type cylindrical battery.

14. A negative electrode for a rechargeable lithium battery, comprising
a current collector; and
a negative active material layer on the current collector,
wherein a Degree of Divergence (DD) value of the negative electrode defined by Equation 1 is 19 to 60, $$DD(\text{Degree of Divergence}) = (I_a/I_{total}) * 100 \qquad (1)$$

wherein:

$I_a$ is a sum of peak intensities at $2\theta = 42.4 \pm 0.2°$, $43.4 \pm 0.2°$, $44.6 \pm 0.2°$, and $77.5 \pm 0.2°$ measured by XRD using a CuKα ray, and $I_{total}$ is a sum of peak intensities at $2\theta = 26.5 \pm 0.2°$, $42.4 \pm 0.2°$, $43.4 \pm 0.2°$, $44.6 \pm 0.2°$, $54.7 \pm 0.2°$, and $77.5 \pm 0.2°$ measured by XRD using a CuKα ray.

15. The negative electrode as claimed in claim 14, wherein the negative active material layer includes a carbon-based negative active material.

16. The negative electrode as claimed in claim 14, wherein a BET specific surface area of the negative electrode is less than about $5.0 m^2/g$.

17. The negative electrode as claimed in claim 14, wherein the negative electrode has a loading level (L/L) of about 6 $mg/cm^2$ to about 65 $mg/cm^2$ on one side of the current collector.

* * * * *